United States Patent [19]

Berenson et al.

[11] 4,034,296
[45] July 5, 1977

[54] OMNI-FREQUENCY PILOT SYSTEM

[75] Inventors: Walter Louis Berenson, Palatine; Ronald Wayne Taylor, Arlington Heights, both of Ill.

[73] Assignee: Motorola, Inc., Schaumburg, Ill.

[22] Filed: Dec. 29, 1975

[21] Appl. No.: 644,797

[52] U.S. Cl. .............................. 325/62; 179/15 BP; 325/49; 325/50; 325/63; 325/329

[51] Int. Cl.² .......................................... H04B 1/62

[58] Field of Search ............... 325/49, 50, 63, 329, 325/62; 179/15 BP

[56] References Cited

UNITED STATES PATENTS

| | | | |
|---|---|---|---|
| 2,699,494 | 1/1955 | Albricht | 325/49 |
| 3,003,036 | 10/1961 | Greefkes | 325/50 |
| 3,084,328 | 4/1963 | Groeneveld | 325/49 |
| 3,300,720 | 1/1967 | Kowols | 325/50 |

Primary Examiner—Harold I. Pitts
Attorney, Agent, or Firm—Victor Myer; James W. Gillman

[57] ABSTRACT

A mixer connected to receive a pilot signal from a suppressed carrier communications system and further connected to receive a signal from a crystal controlled oscillator with a plug-in crystal is disclosed. The output of the mixer is coupled through a very narrow bandpass filter tuned to pass only the converted pilot frequency. The output of the mixer develops a control signal which is coupled to a regulating input of variable gain amplifier means for regulating the gain of the amplifier means in direct proportion to changes in level of the pilot.

5 Claims, 1 Drawing Figure

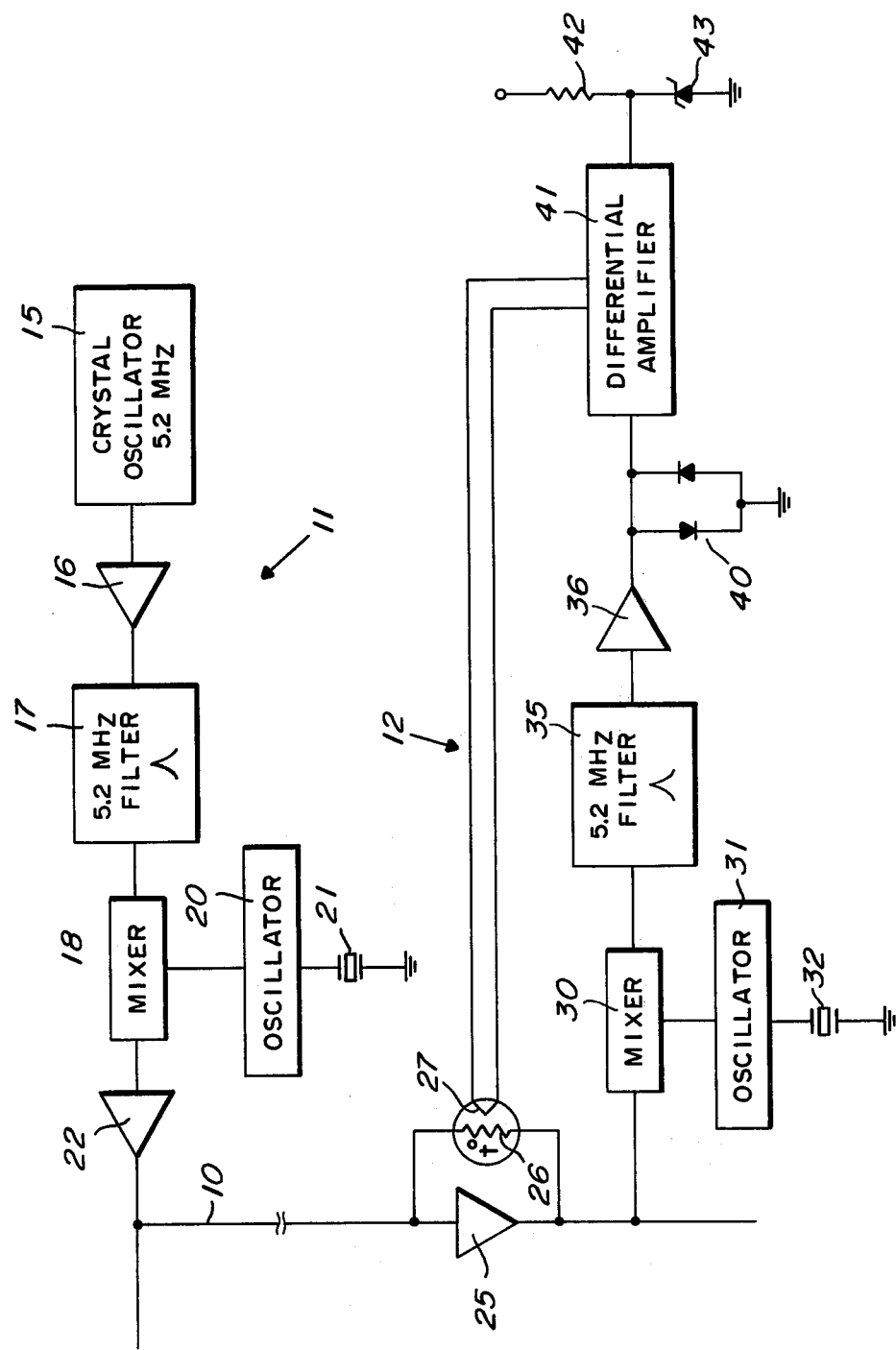

4,034,296

OMNI-FREQUENCY PILOT SYSTEM

BACKGROUND OF THE INVENTION

The present invention is utilized in suppressed carrier communications systems and particularly in multiplex systems where a plurality of systems utilizing pilot signals of different frequencies may be connected together. Also, in many instances, it may be desirable to transfer equipment from one system using a first frequency pilot signal to a second system using a different frequency pilot signal.

In the prior art, equipment has always been manufactured for use with a single pilot signal and, if the equipment is to be used with a different frequency pilot signal, it had to be returned to the factory where crystals and filters were changed and the equipment rewired to receive the different frequency pilot signal. Returning units to the factory for conversion of the pilot signal is extremely expensive and time consuming. Also, the system, or at least portions thereof, is inoperative while the units are being converted.

SUMMARY OF THE INVENTION

The present invention pertains to omni-frequency pilot means for use in a suppressed carrier communications system wherein a mixer is connected to receive the pilot signal on one input and a second input receives a signal from a crystal controlled oscillator having a plug-in crystal connected thereto, with the output of the mixer being coupled through a very narrow bandpass filter to a regulating input of variable gain amplifier means. The plug-in crystal of the oscillator controls the frequency thereof to convert the frequency of the pilot signal to the frequency to which the bandpass filter is tuned and the variable gain amplifier converts the frequency passed by the filter to a gain control voltage for controlling the gain of the variable gain amplifier means in direct proportion to changes in the level of the pilot signal.

It is an object of the present invention to provide new and improved omni-frequency pilot means for use in a suppressed carrier communications system.

It is a further object of the present invention to provide new and improved omni-frequency pilot means which can be utilized with any frequency pilot by simply changing the plug-in crystal.

These and other objects of this invention will become apparent to those skilled in the art upon consideration of the accompanying specification, claims and drawing.

BRIEF DESCRIPTION OF THE DRAWING

Referring to the drawing, the single FIGURE is a block diagram of a pilot generator and receiver for a suppressed carrier communications system embodying the present invention.

DESCRIPTION OF THE PREFERRED EMBODIMENT

Referring to the drawing, the numeral 10 designates a communications link in a suppressed carrier communications system having a pilot generator, generally designated 11, connected thereto and a pilot receiver, generally designated 12, connected thereto at a point remote from the pilot generator 11. As is well known in the art, pilots are generated in suppressed carrier communications systems to control the level of the signal along the communications link and throughout the system between the generation of the communications signals and the reception thereof. In the FIGURE, a novel pilot generator 11 is illustrated in communication with the novel pilot receiver 12. However, it should be understood that the pilot receiver 12 will function as well with prior art pilot generators and the pilot generator 11 will also provide a pilot for prior art pilot receivers.

The pilot generator 11 includes a crystal oscillator 15 which supplies a signal through a limiter 16 and low pass filter 17 to one input of a mixer 18. In the present embodiment the crystal oscillator provides a 5.2 Mz. signal, but it should be understood that any desired frequency might be utilized. 5.2 Mz. was selected in the present system because of the ease in manufacturing the various crystals and other components which must be used to generate and receive pilot signals within the frequency range of 4 Khz. to 4.644 Mhz. Since low frequency crystals are generally unstable, it is desirable to produce crystals in the higher ranges.

A second oscillator 20, the frequency of which is controlled by a plug-in crystal 21, supplies a signal to the mixer 18 on a second input. The signal from the oscillator 20 and the signal from the filter 17 are mixed in the mixer 18 to provide a pilot signal having the desired frequency. This signal is connected through an amplifier 22 to the communications link 10. The amplifier 22 provides the signal with a stable level through means well known to those skilled in the art and will not be described further herein. Thus, by simply changing the plug-in crystal 21 the pilot applied to the communications link 10 can be changed to any desired frequency within the limitations of the suppressed carrier communications system.

An amplifier 25 is connected in the communications link 10 so as to control the level of the communications signals therein. The amplifier 25 is a variable gain amplifier with a thermistor 26 connected in a feedback circuit therearound so as to control the gain of the amplifier in accordance with the temperature of the thermistor 26. A heater 27 is situated adjacent the thermistor 26 and controls the heat of the thermistor 26 in accordance with a DC voltage applied thereto. The thermistor 26 and heater 27 are manufactured in a single package and are commercially available.

One input of a mixer 30 is connected to the communications link 10 at the output of the amplifier 25. A second input of the mixer 30 is connected to the output of a crystal controlled oscillator 31, the frequency of which is controlled by a plug-in crystal 32. An output of the mixer 30 is coupled through a very narrow bandpass filter 35 to an amplifier 36. In the present embodiment, the bandpass filter 35 is tuned to 5.2 Mhz. and the plug-in crystal 32 of the oscillator 31 is selected so that only the desired pilot signal will mix with the output of the oscillator 32 in the mixer 30 to produce the 5.2 Mhz. signal. Thus, the pilot receiver 12 will receive any pilot generated in the communications system by simply changing the plug-in crystal 32 so that the output of the oscillator 31 mixes with the pilot in the mixer 30 to produce a signal at the frequency of the filter 35.

The AC output signal from the amplifier 36 is rectified by a pair of back-to-back diodes 40 and applied to one input of a differential amplifier 41. A second input of the differential amplifier 41 has a reference voltage applied thereto, by means of voltage divider network including a resistor 42 and Zener diode 43. The output of the differential amplifier 41 supplies the DC voltage to the heater 27 so that the gain of the amplifier 25 changes linearly in direct proportion to changes in the level of the pilot signal at the output of the amplifier 25.

Thus, an omni-frequency pilot system is illustrated including an improved pilot generator and improved pilot receiver. The pilot frequencies, or the operating frequencies, of both the generator and the receiver are quickly changed in the field by simply changing the plug-in crystals 21 and 32, respectively. No expensive rewiring or alterations of the components are required and the cost and disruption of the system is minimal.

We claim:

1. Omni-frequency pilot means for use in a suppressed carrier communications system including a communications link, said pilot means comprising:
   a. a pilot signal generator including first crystal controlled oscillator means having an output, a second crystal controlled oscillator with a plug-in crystal and an output, a mixer having a first input connected to the output of said first crystal controlled oscillator means, a second input connected to the output of said second crystal controlled oscillator and an output, and level control means connected between the output of said mixer and the communications link for controlling the level of the pilot applied to the communications link; and
   b. a pilot signal receiver including variable gain amplifier means connected into the communications link and having a regulating input for receiving a regulating signal thereon, a mixer having a first input coupled to the communications link for receiving a pilot signal from said pilot generator and further having a second input and an output, a crystal controlled oscillator having a plug-in crystal connected thereto for controlling the frequency thereof and further having an output connected to the second input of said receiver mixer, a bandpass filter tuned to pass a predetermined frequency, said filter being coupled between the output of said receiver mixer and the regulating input of said variable gain amplifier means, and the plug-in crystal of said receiver oscillator controlling the frequency thereof to convert the frequency of the received pilot signal in said receiver mixer to the predetermined frequency of said bandpass filter.

2. Omni-frequency pilot means for regulating the gain of an amplifier in a suppressed carrier communications system comprising:
   a. variable gain amplifier means having a regulating input for receiving a regulating signal thereon;
   b. a mixer having a first input for receiving a pilot signal thereon, a second input and an output;
   c. a crystal controlled oscillator having a plug-in crystal connected thereto for controlling the frequency thereof and further having an output connected to the second input of said mixer;
   d. a bandpass filter tuned to pass a predetermined frequency, said filter being coupled between the output of said mixer and the regulating input of said variable gain amplifier means; and
   e. the plug-in crystal of said oscillator controlling the frequency thereof to convert the frequency of the pilot signal in said mixer to the predetermined frequency of said bandpass filter.

3. Omni-frequency pilot means as claimed in claim 2 wherein the bandpass filter is tuned to pass a frequency above 5 mHz.

4. Omni-frequency pilot means as claimed in claim 2 wherein the variable gain amplifier means includes circuitry for converting the predetermined frequency to a gain control voltage for controlling the gain of the variable gain amplifier means in direct proportion to changes in level of the pilot signal.

5. Omni-frequency pilot means for use in a suppressed carrier communications system including a communications link, said pilot means comprising:
   a. a first crystal controlled oscillator having an output and providing a signal of a predetermined frequency thereon;
   b. limiter means connected to the output of said first oscillator and providing an output signal with a fixed amplitude;
   c. a low pass filter connected to said limiter means and tuned to pass only a signal of the predetermined frequency;
   d. a second crystal controlled oscillator providing a signal at an output and having a plug-in crystal for varying the frequency of the signal at the output with changes of the crystal;
   e. a mixer having a first input connected to the bandpass filter for receiving the signal of the predetermined frequency thereon, a second input connected to the output of said second oscillator, and an output for providing a pilot signal thereon with a frequency determined by the frequency of the plug-in crystal in said second oscillator; and
   f. level control means connected to the output of said mixer and to the communications link for controlling the level of the pilot signal applied to the communications link.

* * * * *